US 6,688,094 B2

(12) United States Patent
Berndt et al.

(10) Patent No.: US 6,688,094 B2
(45) Date of Patent: Feb. 10, 2004

(54) BELT DRIVEN ROLLER BRUSH ASSEMBLY

(75) Inventors: Dennis J. Berndt, Eagan, MN (US); Scott M. Coffin, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/061,369

(22) Filed: Feb. 1, 2002

(65) Prior Publication Data

US 2003/0145570 A1 Aug. 7, 2003

(51) Int. Cl.[7] .............................................. A01D 34/62
(52) U.S. Cl. .............................................. 56/249; 56/7
(58) Field of Search ........................ 56/11.6, 249, 294, 56/6, 7, DIG. 20; 474/8, 17, 46, 144, 146, 148, 150

(56) References Cited

U.S. PATENT DOCUMENTS

| 4,021,996 A | | 5/1977 | Bartlett et al. |
| 4,685,228 A | * | 8/1987 | Gisler et al. .................. 37/197 |
| 5,228,277 A | | 7/1993 | Smith et al. |
| 5,482,562 A | * | 1/1996 | Abernathy ..................... 134/6 |
| 5,682,735 A | | 11/1997 | Swenson et al. |
| 6,029,433 A | | 2/2000 | Westbrook et al. |

FOREIGN PATENT DOCUMENTS

GB    1387211    3/1975

* cited by examiner

*Primary Examiner*—Robert E. Pezzuto
(74) *Attorney, Agent, or Firm*—James W. Miller (57) ABSTRACT

A rotatable brush is located adjacent to and in contact with a ground engaging roller of a cutting unit of a mower to clean debris from the roller surface. The brush includes a brush shaft having at least one flight of brush bristles releasably secured to the brush shaft by a pair of fasteners. This permits easy replacement of the flight of brush bristles without having to replace the brush shaft. One end of the brush shaft is driven by a belt drive system with the driven end of the brush shaft passing through an elongated slot in a pivotally adjustable tensioning plate. The plate can be pivoted to adjust the tension in the drive belt without moving the driven end of the brush shaft, thus not affecting or changing the position of the brush relative to the roller. Drive can be imparted to the belt drive system using a hardened cap screw that is threaded into one end of the shaft of a rotatable reel on a reel cutting unit. The head of the cap screw mates in a non-circular socket on one end of a drive shaft to transfer power to the drive shaft and, thus, to the belt drive system.

20 Claims, 8 Drawing Sheets

BELT DRIVEN ROLLER BRUSH ASSEMBLY

TECHNICAL FIELD

This invention relates to a cutting unit supported for rolling over the ground by one or more ground engaging rollers. More particularly, this invention relates to a brush assembly having a rotatable brush in engagement with the outer diameter of the roller for cleaning debris from the roller.

BACKGROUND OF THE INVENTION

Mowers having reel cutting units are well known in the turf care industry for cutting grass. Such reel cutting units use a rotatable reel to sweep uncut grass against a sharpened bedknife to cut the grass. The reel cutting units include one or more ground engaging rollers to support the cutting unit for rolling over the ground. During operation, these rollers can become caked with grass clippings and the like, thereby changing the height of cut or decreasing the quality of cut provided by the cutting unit.

Various brushes are known in the art for cleaning debris from the outer diameter of the roller. Such a brush is supported on the frame of the cutting unit to be parallel to and overlie the roller. The brush typically includes a helical flight of brush bristles in engagement with the outer diameter of the roller. The brush is often powered by a belt drive system which rotates the brush at a speed of rotation different from the rotational speed of the roller to clean grass clippings and other debris from the roller. U.S. Pat. No. 6,029,433 shows a brush of this type.

Some prior art roller cleaning brushes are not uniformly adjustable relative to the roller to compensate for wear. For example, while one end of the brush can be raised or lowered relative to the roller as that end wears, the opposite end of the brush may not be so adjustable. Thus, even if one attempts to compensate for brush wear by lowering the adjustable end of the brush, this results in uneven cleaning across the length of the brush since the non-adjustable end cannot be similarly lowered. Thus, many prior art roller cleaning brushes must simply be removed and replaced after they begin to wear significantly.

Moreover, some prior art roller cleaning brushes adjust the belt tension in the belt drive system by sliding the bearing housing that supports the driven end of the brush fore and aft. However, the fore and aft position of the other end of the brush is fixed. Thus, the act of tensioning the belt will skew the brush relative to the roller in a fore and aft direction, with the driven side of the brush being further forward or further rearward than the non-driven side of the brush. This also affects how uniformly the brush cleans across the length of the roller.

Prior art roller cleaning brushes typically have the helical flight of brush bristles fixed to the roller brush shaft. For example, the brush bristles are often housed or cased in a base with the base being welded to the roller brush shaft. Thus, when the brush bristles become worn, it is necessary to remove and replace the entire brush, including the roller brush shaft to which the flight of brush bristles is attached. It is relatively expensive to replace the brush due to the fact that an entire new brush must be purchased and installed.

SUMMARY OF THE INVENTION

One aspect of this invention relates to a roller cleaning brush assembly for cleaning a ground engaging roller of a grass cutting unit of a mower. This roller cleaning brush assembly comprises a brush shaft rotatably journalled to the cutting unit with the brush shaft having at least one flight of brush bristles in contact with the roller to clean the roller. The flight of brush bristles is releasably attached to the brush shaft such that the flight of brush bristles can be removed and replaced on the brush shaft.

Another aspect of this invention relates to a roller cleaning brush assembly for cleaning a ground engaging roller of a grass cutting unit of a mower. This roller cleaning brush assembly comprises a rotatable brush attached to the cutting unit and having at least one flight of brush bristles in contact with the roller to clean the roller. A belt drive system is provided for rotating the brush. The belt drive system comprises an endless drive belt entrained around a drive pulley and a driven pulley. An idler member is in contact with the drive belt and movable relative to the drive belt for adjusting tension in the drive belt. The idler member is adjustable on the cutting unit to adjust the drive belt tension without changing the position of the brush relative to the roller.

Yet another aspect of this invention relates to a roller cleaning brush assembly for cleaning a ground engaging roller of a reel cutting unit of a mower. The reel cutting unit has a rotatable reel that sweeps uncut grass against a bedknife. One end of a shaft of the reel has an interiorly threaded bore. The roller cleaning brush assembly comprises a rotatable brush attached to the cutting unit and having at least one flight of brush bristles in contact with the roller to clean the roller. A belt drive system is provided for rotating the brush. The belt drive system is powered by a drive shaft having a non-circular socket at one end. A cap screw has a threaded shank and a non-circular head, the shank of the cap screw being screwed into the interiorly threaded bore on the one end of the cutting reel shaft and the non-circular head of the cap screw having a shape which matches that of the non-circular socket on the drive shaft to allow the head of the cap screw to be inserted into the socket on the drive shaft to rotatably power the drive shaft from rotation of the cutting reel shaft.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Introduction

Figure 1:
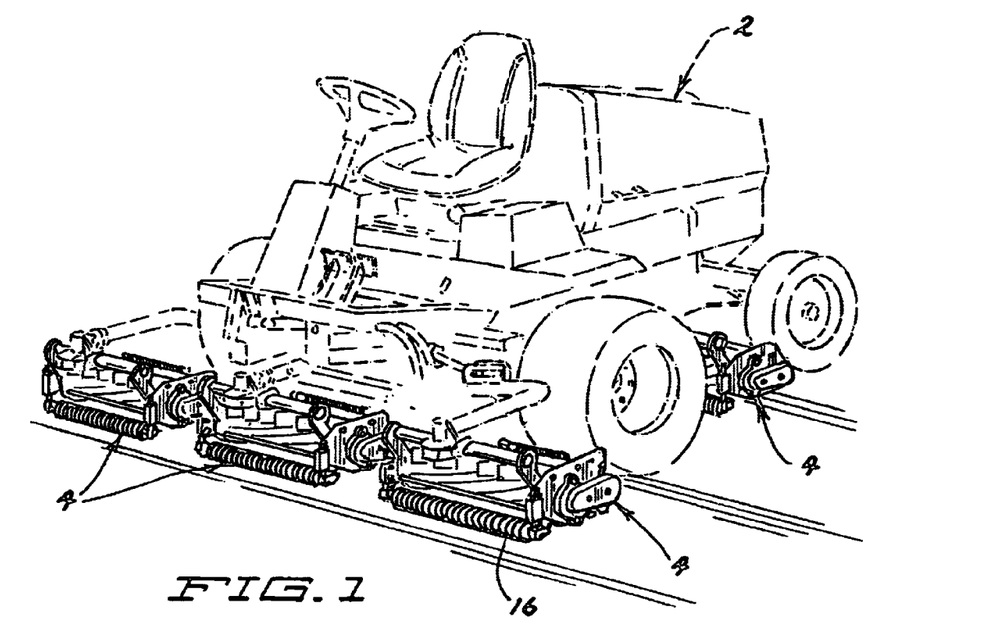
FIG. 1 is a perspective view of a riding mower which carries a plurality of reel cutting units.

FIG. 1 depicts a riding mower 2 having a plurality of reel cutting units 4. Three front reel cutting units 4 are shown at the front of mower 2 spaced apart from one another by small gaps. Two trailing reel cutting units 4, only one of which is shown in FIG. 1, are mounted to mower 2 beneath the front and rear wheels of mower 2. Trailing reel cutting units 4 are positioned to cover the gaps between front reel cutting units 4 so that all of reel cutting units 4 collectively cut a single wide swath of grass as mower 2 moves over the ground.

Figure 2:
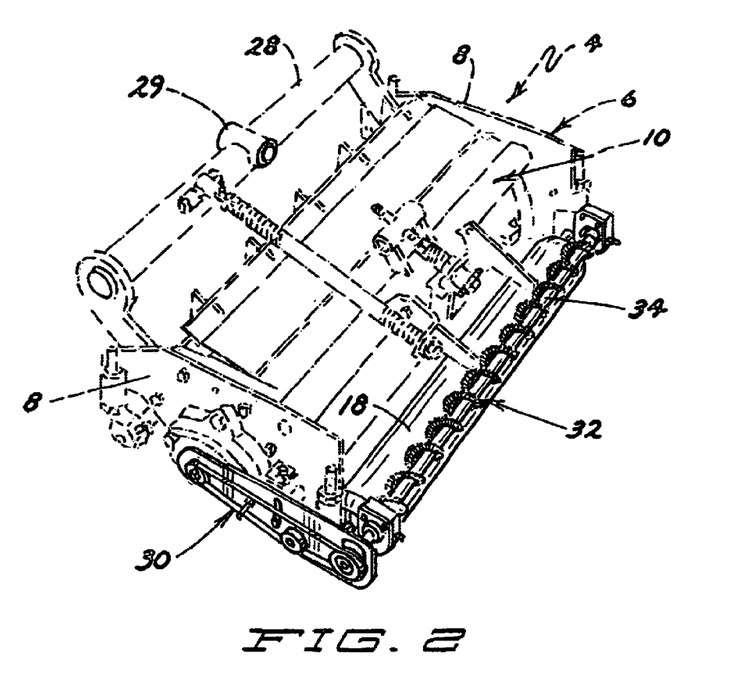
FIG. 2 is a perspective view of a reel cutting unit having a first embodiment of a roller cleaning brush assembly according to this invention attached thereto.

Each reel cutting unit 4 comprises a frame 6 that includes spaced side plates 8 joined together by transverse cross members 10 and a transverse back plate (not shown). See FIG. 2. A rotatable reel 12 having helical blades is journalled between side plates 8 and in front of the back plate. A sharpened bedknife 14 cooperates with reel 12 such that rotation of reel 12 sweeps uncut grass against bedknife 14 to sever the grass. Reel 12 is rotated by a drive system which may comprise a mechanical drive taken from mower 2 or by a separate drive motor (not shown), either hydraulic or electric, connected to reel 12.

Figure 3:
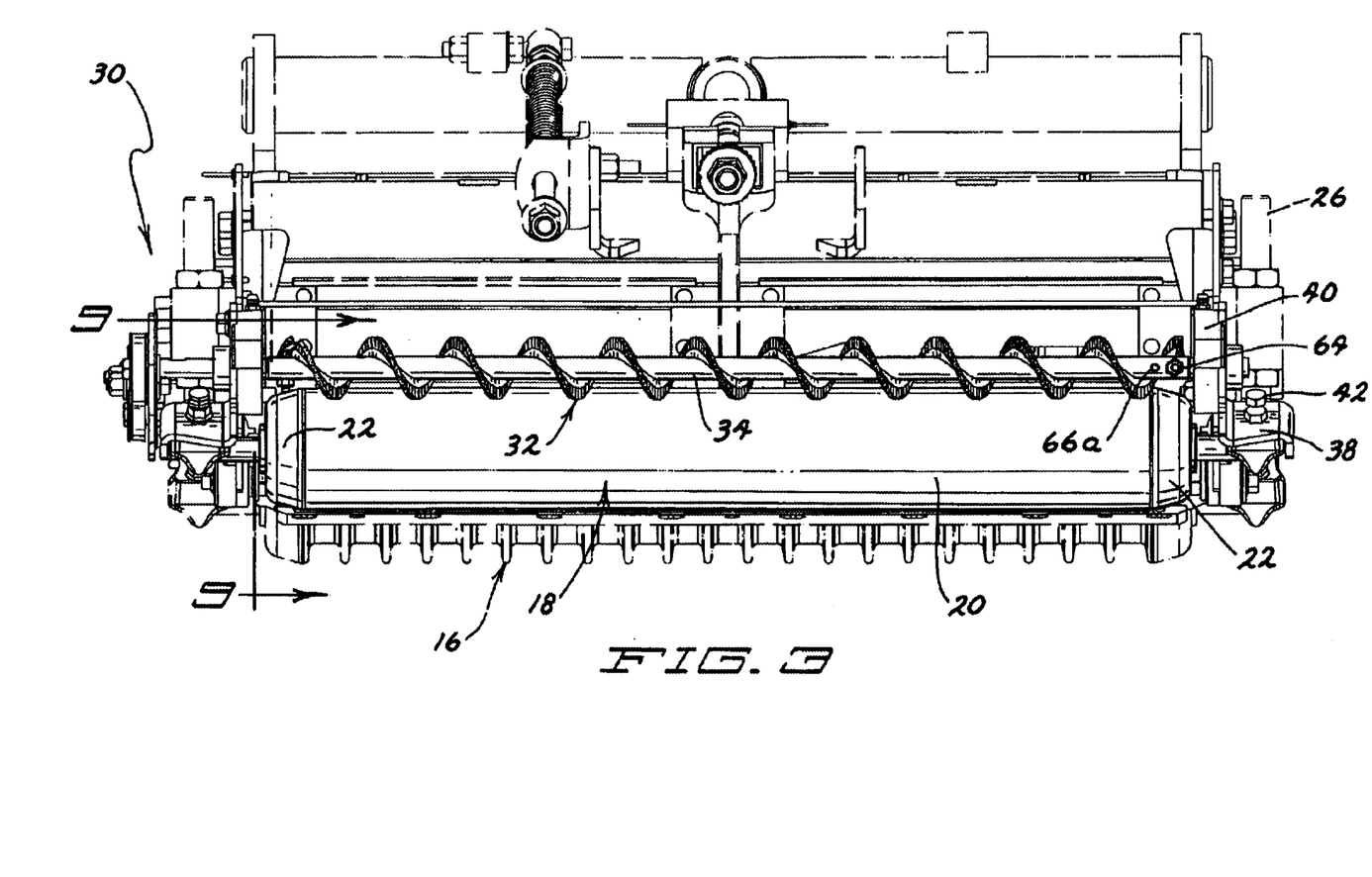
FIG. 3 is a front elevational view of the first embodiment of the roller cleaning brush assembly shown in FIG. 2.

Each reel cutting unit 4 is self-supporting for rolling over the ground by front and rear rollers 16 and 18 extending between side plates 8. As shown in FIGS. 1 and 3, front roller 16 may be grooved and when so grooved is often known in the art as a Wiehle roller. Rear roller 18 typically comprises a smooth cylinder 20 having a beveled shoulder 22 at each end as shown in FIG. 3.

The height of cut provided by cutting unit 4 can be adjusted by changing the vertical position of front and rear rollers 16 and 18 relative to side plates 8. In this case, each end of front and rear rollers 16 and 18 is rotatably journalled in a roller support 24 that is attached to an upwardly extending stem or shaft 26 of a conventional height of cut adjustment mechanism. When stem or shaft 26 is rotated, roller support 24 is moved up and down to change the height of cut by changing the position of roller 16 or 18 on cutting unit 4.

Each reel cutting unit 4 includes a mount 28 for suspending reel cutting unit 4 from mower 2 with such mount 28 having at least one pivot 29 for allowing reel cutting unit 4 to tilt at least from side-to-side when following the contours of the ground. Other pivots may also be provided for allowing ground contour following of reel cutting unit 4 about other axes.

The foregoing description of mower 2 and of reel cutting unit 4 has been provided for background purposes only. This invention relates to a roller cleaning brush assembly 30 for cleaning debris from the outer diameter of at least one of the ground engaging rollers 16 or 18 of a reel cutting unit 4 used on a mower 2. As such, roller cleaning brush assembly 30 of this invention may be used with many types of mowers 2, including rotary mowers having one or more blades rotating in horizontal cutting planes, as long as such mowers have at least one ground engaging roller. Thus, this invention is not limited to the specific mower 2 or the specific reel cutting units 4 shown herein.

Figure 4:
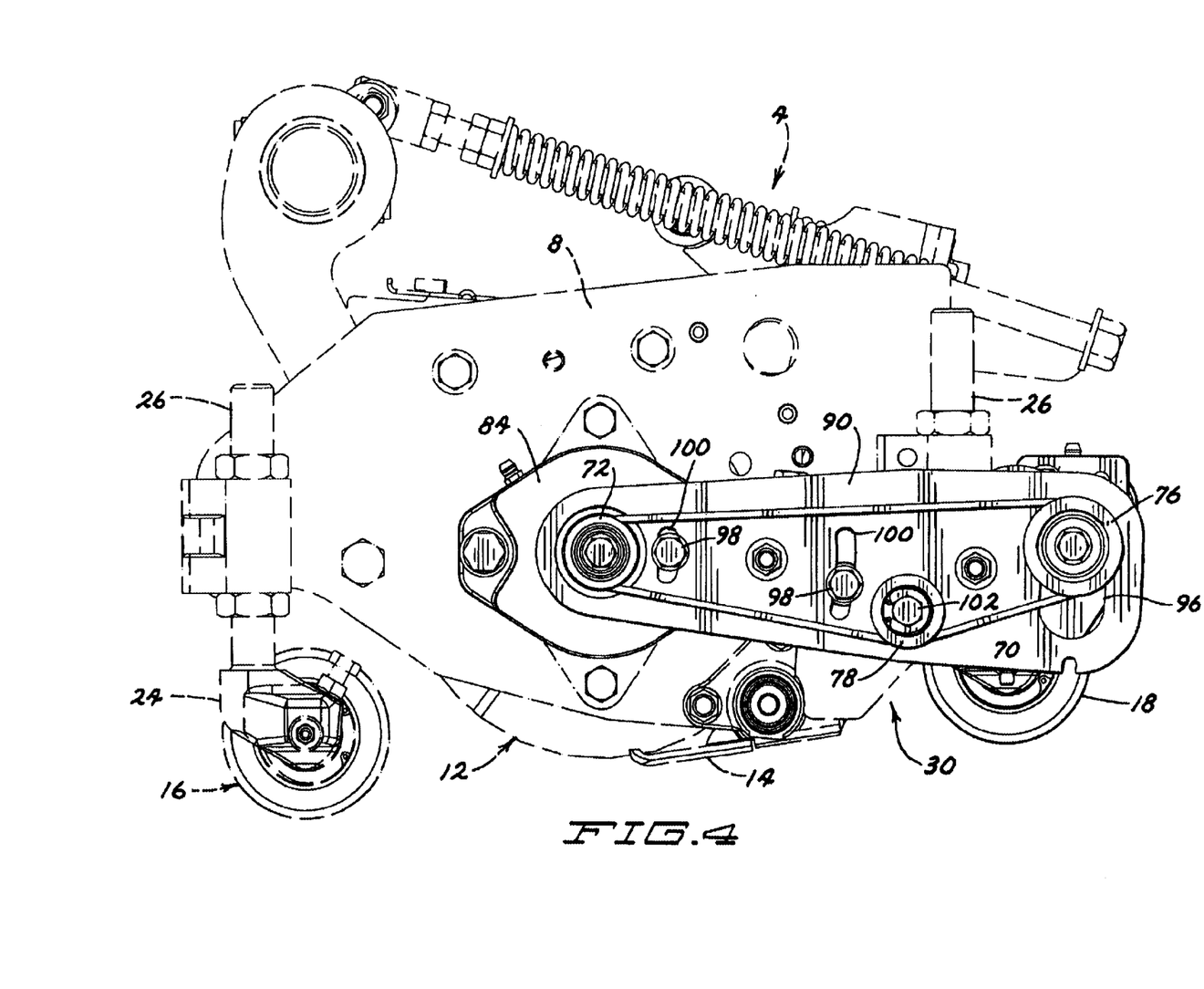
FIG. 4 is a side elevational view of the first embodiment of the roller cleaning brush assembly shown in FIG. 2.
Figure 5:
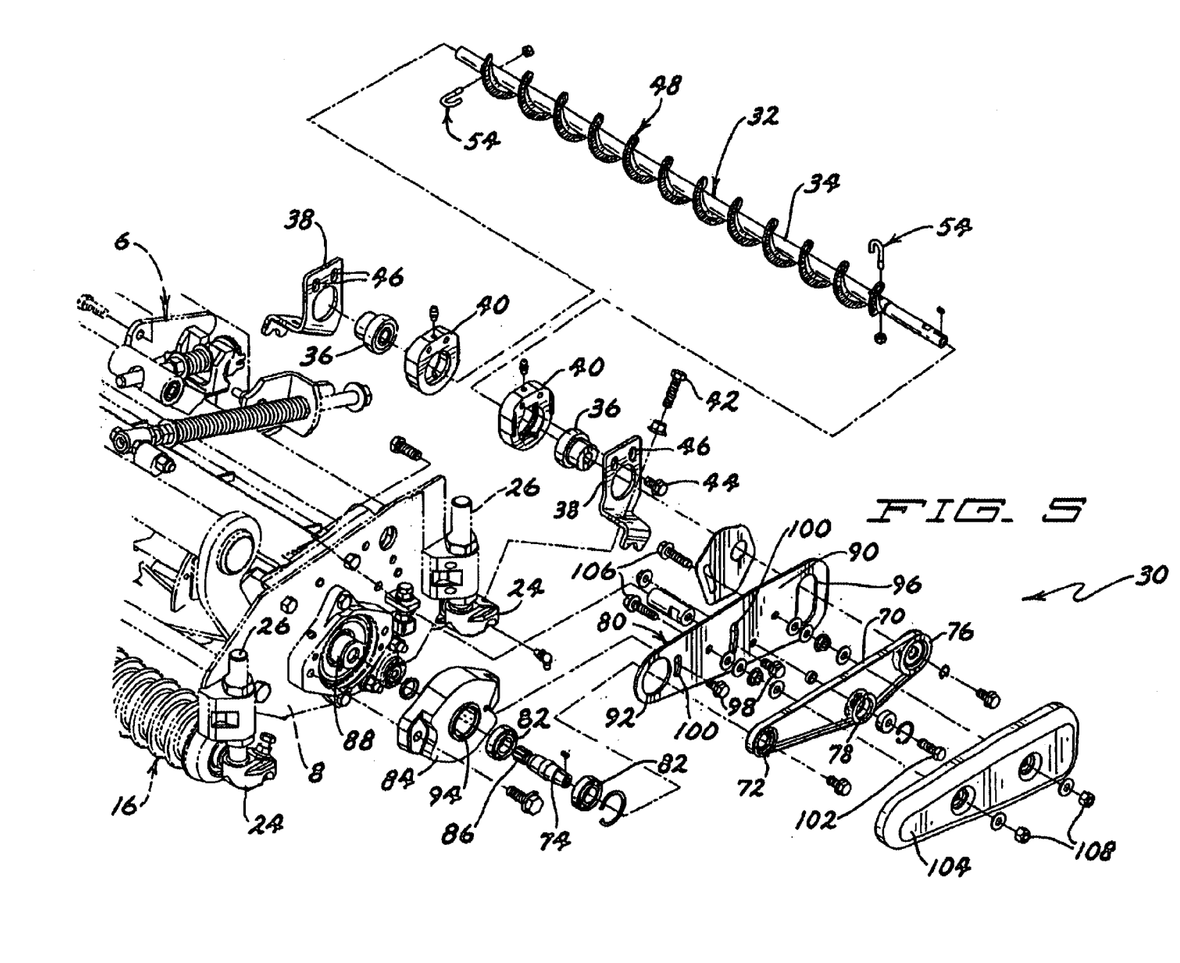
FIG. 5 is an exploded perspective view of the first embodiment of the roller cleaning brush assembly shown in FIG. 2.
Figure 6:
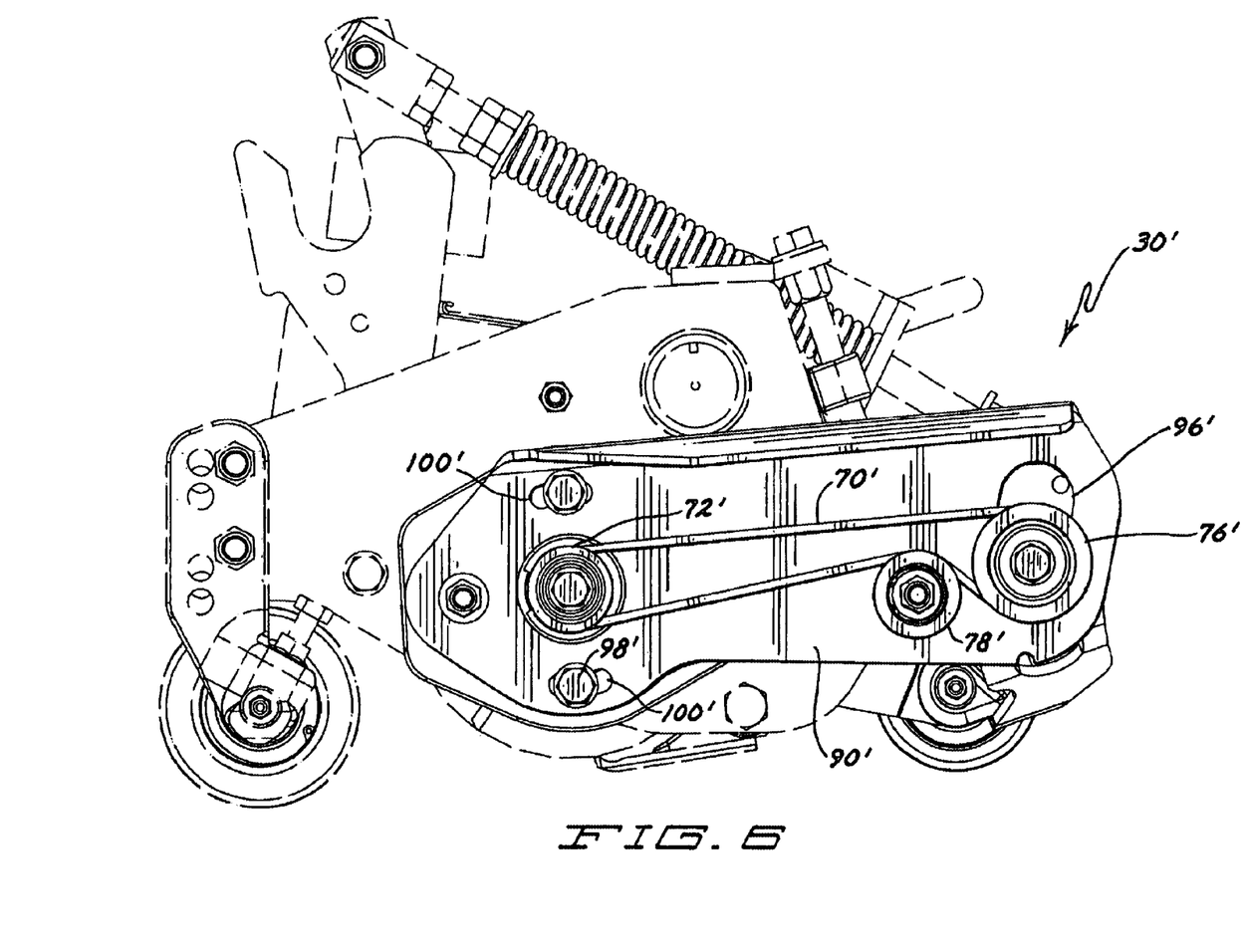
FIG. 6 is a side elevational view of a reel cutting unit having a second embodiment of a roller cleaning brush assembly according to this invention attached thereto.
Figure 7:
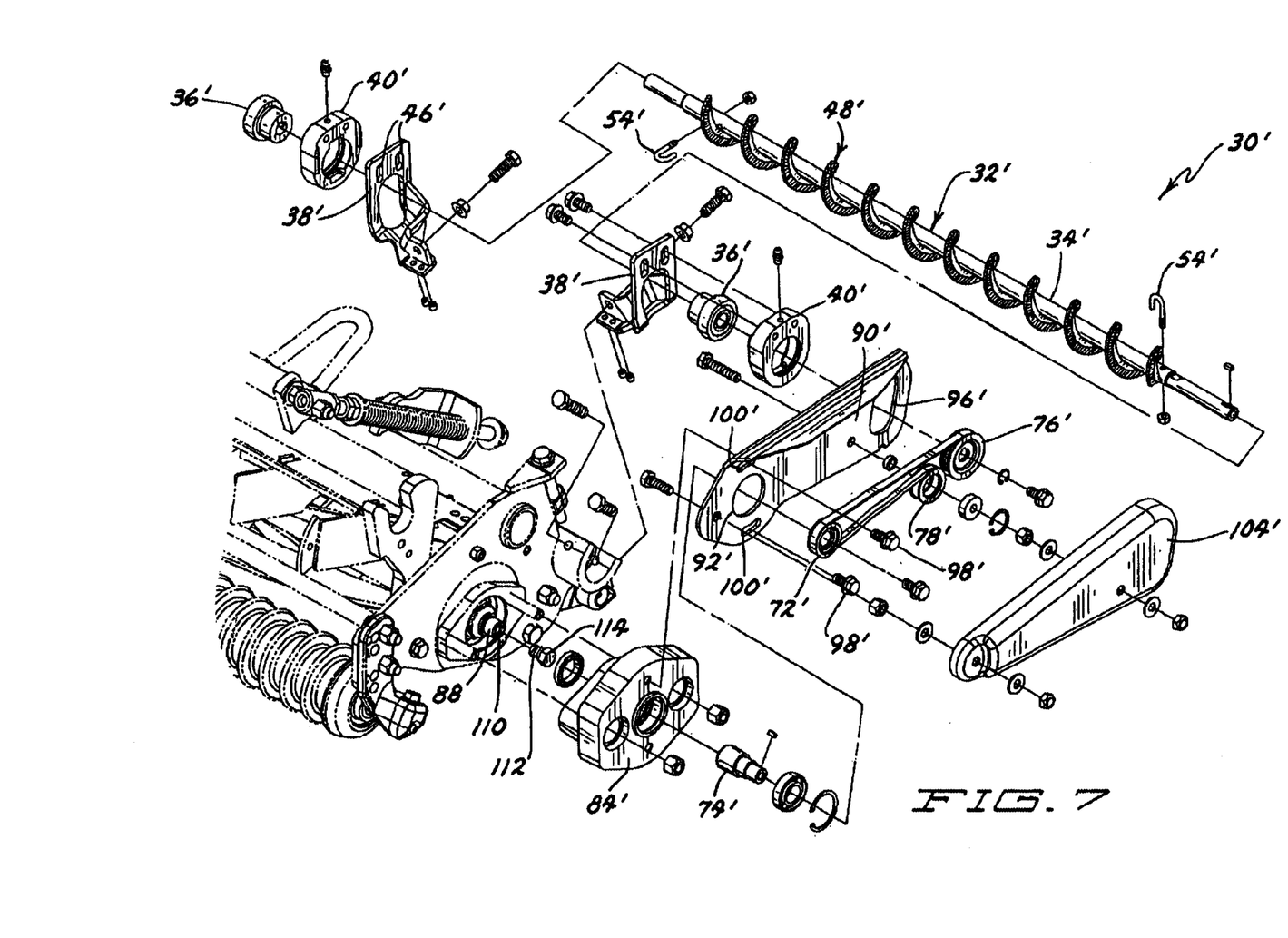
FIG. 7 is an exploded perspective view of the second embodiment of the roller cleaning brush assembly shown in FIG. 6.
Figure 8:
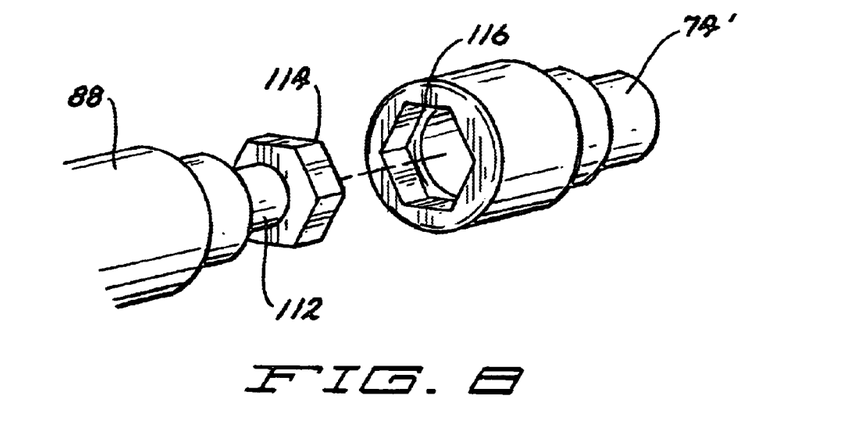
FIG. 8 is an exploded perspective view of a portion of the second embodiment of the roller cleaning brush assembly shown in FIG. 6, particularly illustrating the drive connection between the reel shaft and the drive shaft of the second embodiment of the roller cleaning brush assembly.
Figure 9:
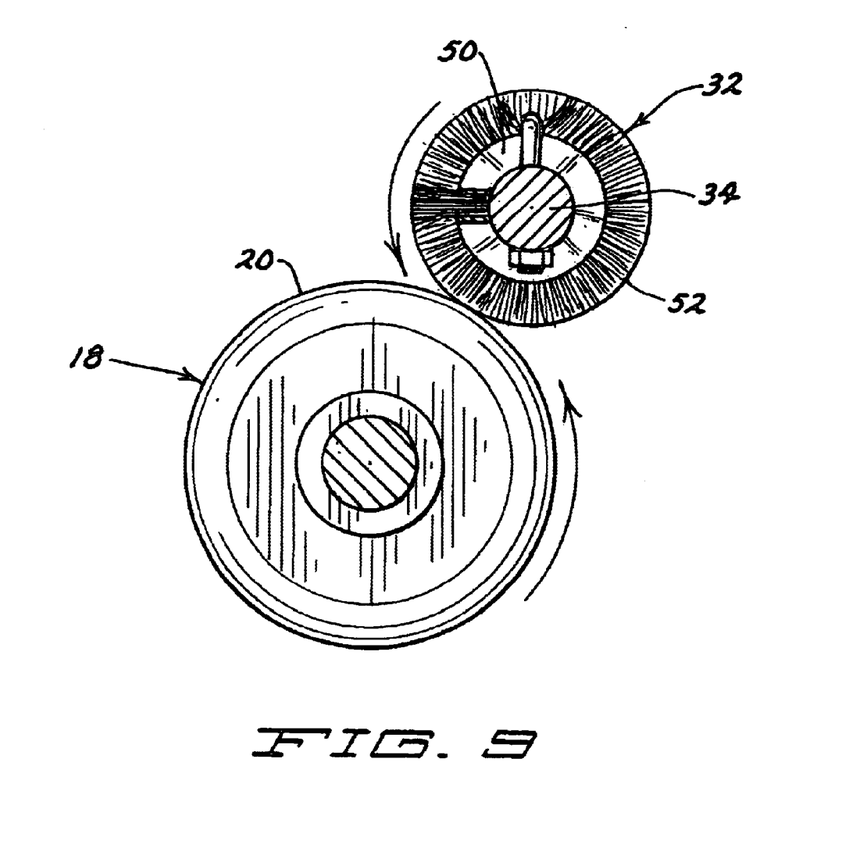
FIG. 9 is a cross-sectional view of the brush in the first embodiment of the roller cleaning brush assembly taken along lines 9—9 in FIG. 3.

A first embodiment of roller cleaning brush assembly 30 of this invention is illustrated in FIGS. 2–5, 9 and 10. A second embodiment of roller cleaning brush assembly 30' of this invention is illustrated in FIGS. 6–8. Similar reference numerals will be used to refer to similar components in both embodiments of the invention with the exception that such reference numerals used with respect to components of the second embodiment of the invention will have a prime suffix. For example, reference numeral 30 applies to the roller cleaning brush assembly in the first embodiment of the invention and reference numeral 30' applies to the roller cleaning brush assembly in the second embodiment of the invention.

The First Embodiment

Referring now to roller cleaning brush assembly 30 of the first embodiment of this invention as shown in FIGS. 2–5, roller cleaning brush assembly 30 includes a rotatable brush 32. Brush 32 is made from an elongated, cylindrical, brush shaft 34 which is rotatably journalled at either end in bearings 36. Bearings 36 are themselves attached to frame 6 of reel cutting unit 4 by brackets 38 and by bearing housings 40 fixed to brackets 38. See FIG. 5. The purpose of brackets 38, bearing housings 40, and bearings 36 is simply to rotatably support each end of brush shaft 34.

In this invention, each bracket 38 that supports a bearing housing 40 is fixed to one roller support 24 by being bolted to such roller support 24 using a bolt 42. Each bearing housing 40 is fixed to bracket 38 by bolts 44 which pass through elongated vertical slots 46 in each bracket 38. The elongated vertical slots 46 allow each bearing housing 40 to be adjusted up and down on bracket 38. This allows both ends of brush 32 to be adjusted up and down relative to roller 18 so that brush 32 can be moved down closer to roller 18 to compensate for wear in brush 32.

In addition, since both brackets 38 are fixed to roller supports 24 that rotatably journal roller 18, brush 32 moves vertically with roller 18 when roller supports 24 are moved up and down in a height of cut adjustment operation. Thus, the height of cut of mower 2 can be adjusted without changing the relationship of brush 32 to roller 18.

The Replaceable Flight of Brush Bristles

Brush 32 is made from a flight 48 of brush bristles which is releasably attached to brush shaft 34. Flight 48 of brush bristles includes an aluminum, extruded base member 50 having an upwardly facing cavity which receives and supports brush bristles 52. Flight 48 of brush bristles is helically shaped by helically twisting base member 50 and brush bristles 52 after brush bristles 52 have been stuffed into the cavity of base member 50. This helically twisted flight 48 of brush bristles may then be installed on brush shaft 34 simply by sliding flight 48 of brush bristles over one end of the shaft. The helix in flight 48 of brush bristles is chosen so that the inner diameter of the helix approximates the outer diameter of brush shaft 34 so that the underside of base member 50 abuts against the outer diameter of brush shaft 34 once flight 48 of brush bristles is slid onto brush shaft 34.

A means is provided for releasably securing flight 48 of brush bristles to brush shaft 34. One embodiment for such a securing means comprises J-hook fasteners 54 each of which has a long leg 56 and a short leg 58 connected together by a U-shaped end 60. The free end 62 of long leg 56 includes a threaded portion that threadedly receives a nut 64. Two such J-hook fasteners 54 are provided with one fastener 54 being used to releasably clamp each end of flight 48 of brush bristles to brush shaft 34.

Figure 10:
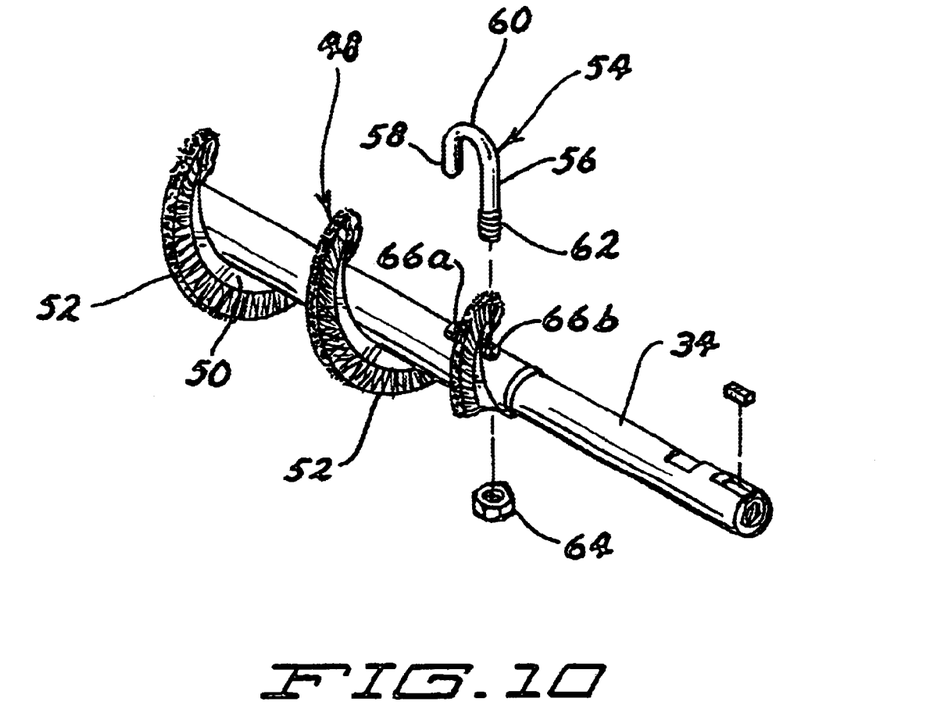
FIG. 10 is an enlarged perspective view of one end of the brush shaft of the brush in the first embodiment of the roller cleaning brush assembly, particularly illustrating one of the J-hook fasteners used to attach the flight of brush bristles to the brush shaft.

J-hook fasteners 54 are installed after flight 48 of brush bristles has been slid over brush shaft 34. Once this has been done and with the U-shaped end 60 of J-hook fastener 54 pointing towards brush shaft 34, each J-hook fastener 54 can be pushed downwardly into engagement with the end of flight 48 of brush bristles until short leg 58 of J-hook fastener 54 passes into a hole 66a provided in the surface of brush shaft 34 and until long leg 56 of J-hook fastener 54 passes into and through another hole 66b provided in the surface of brush shaft 34. FIG. 10 illustrates one J-hook fastener 54 and holes 66a and 66b that receive the legs 56 and 58 of fastener 54. In fact, long leg 56 of J-hook fastener 54 is long enough to stick out through the other side of brush shaft 34 such that nut 64 can be threaded onto the free end 62 of J-hook fastener 54 and tightened up against the other side of brush shaft 34. When J-hook fastener 54 is installed in this manner and nut 64 is tightened, each end of flight 48 of brush bristles will be firmly captured within one J-hook fastener 54 and clamped to brush shaft 34 with J-hook fasteners 54 pressing base member 50 that holds brush bristles 52 against the outer diameter of brush shaft 34.

The use of J-hook fasteners 54 to removably hold flight 48 of brush bristles to brush shaft 34 allows the user to easily remove and replace a worn or dirty flight of brush bristles with a new flight of brush bristles. Thus, brush shaft 34 itself need not also be discarded, but is reusable. This is more economical than a brush in which flight 48 of brush bristles is not replaceable on brush shaft 34.

While the use of J-hook fasteners 54 is one embodiment of a fastener that may be used to removably attach flight 48 of brush bristles to brush shaft 34, other kinds of fasteners or fastening systems could also be used.

The Belt Drive System

Roller cleaning brush assembly 30 includes a belt drive system for rotatably powering brush 32. Referring to FIGS. 4 and 5, the belt drive system includes an endless drive belt 70 entrained around a drive pulley 72 located on a powered drive shaft 74 and a driven pulley 76 carried on one end of brush shaft 34. Drive belt 70 is tensioned by an idler pulley 78 that is carried on an adjustable tensioning member 80. When properly tensioned, the rotation of powered drive shaft 74 will rotate drive pulley 72 thereby causing drive belt 70 to transmit power to driven pulley 76 to rotate brush shaft 34. The belt drive system is normally configured to rotate brush shaft 34 in the same direction of rotation as roller 18 during forward motion of mower 2 but at a different rotational speed than the rotational speed of roller 18. However, because the bottom of brush 32 contacts the upper portion of roller 18, the contacting surfaces of brush 32 and roller 18 are actually moving oppositely to one another. See FIG. 9.

Drive shaft 74 that carries drive pulley 72 is rotatably journalled in bearings 82 that are received in a brush drive shaft housing 84. Brush drive shaft housing 84 is fixed or bolted to one side of frame 6 of reel cutting unit 4. One end of drive shaft 74 is splined, as shown at 86, and fits within a shaft 88 of reel 12. The inner diameter of reel shaft 88 is similarly splined to form a drive connection with drive shaft 74. Thus, as reel 12 rotates, drive is taken from reel shaft 88 via the splined connection to drive shaft 74 to also rotate brush 32.

Belt tensioning member 80 comprises a plate 90 having a circular opening 92 at one end through which drive shaft 74 extends. Plate 90 is pivotally journalled on an annular ring or rim 94 formed on brush drive shaft housing 84. The other end of plate 90 includes an elongated slot 96 through which the driven end of brush shaft 34 extends. Slot 96 is long enough so that plate 90 can be pivoted upwardly and downwardly about its pivotal connection to the ring or rim 94 on brush drive shaft housing 84 without carrying brush shaft 34 with it. In other words, plate 90 can be pivotally adjusted with the front end of plate 90 pivoting up and down without in any way changing the position of brush 32 relative to roller 18.

Plate 90 can be locked in a pivotally adjusted position by two bolts 98 that are threaded into holes or openings provided either on brush drive shaft housing 84 or adjacent side plate 8 of reel cutting unit 4. Bolts 98 pass through elongated slots 100 in plate 90 with the ends of slots 100 defining the amount of pivotal adjustment for plate 90. When bolts 98 are loosened, plate 90 can be pivoted up or down relative to brush drive shaft housing 84 and relative to cutting unit 4 as far as the ends of slots 100 will permit. Once plate 90 is in a desired position, bolts 98 can be tightened to lock plate 90 in place.

Idler pulley 78 is carried on a shaft 102 that is carried on plate 90. Thus, as plate 90 is pivoted upwardly or downwardly, idler pulley 78 will be carried with plate 90 to either decrease or increase, respectively, the tension in drive belt 70. This adjusts the driving force applied to brush 32. Changes in tension are needed to ensure that drive belt 70 applies a proper amount of rotational force to brush 32 despite any stretch or elongation in drive belt 70.

Since brush shaft 34 is rotatably journalled on frame 6 of reel cutting unit 4 independently of plate 90, and since brush shaft 34 passes through plate 90 in a slot 96 that is long enough to accommodate the pivotal adjustment of plate 90, the pivotal adjustment of plate 90 does not vertically lift or horizontally pull the driven end of brush 32 relative to the other end of brush 32. Thus, brush 32 remains parallel to roller 18 in both vertical and horizontal planes even when the belt tension is adjusted.

The belt drive system can be enclosed within a cover 104 to help prevent inadvertent contact with drive belt 70. Cover 104 is secured to plate 90 by bolts 106 that pass outwardly from plate 90 through holes in cover 104. Nuts 108 are tightened to the ends of bolts 106 to secure cover 104 to plate 90. To pivotally adjust plate 90, cover 104 is removed in order to gain access to the heads of bolts 98 that must be loosened in order for plate 90 to be pivoted. In the side elevational view of FIG. 4, cover 104 has been removed and is not shown for the purpose of clarity.

The Second Embodiment

Turning now to FIGS. 6–8, the second embodiment of roller cleaning brush assembly 30' of this invention shares many of the characteristics of the first embodiment. Namely, the second embodiment of roller cleaning brush assembly 30' uses a replaceable flight 48' of brush bristles and the use of a pivotal plate 90' to adjust the tension in idler pulley 78' independently of the position of brush 32' relative to roller 18.

The placement of bolts 98' used to fix the position of plate 90', and the placement of slots 100' through which bolts 98' pass, are different in the second embodiment than in the first embodiment. In the first embodiment, slots 100 were provided in plate 90 between circular hole 92 at one end of plate 90 and slot 96 through which brush shaft 34 passes, with slots 100 having different lengths to accommodate the maximum pivotal adjustment of plate 90. In the second embodiment, slots 100' are now located above and below hole 92' at one end of plate 90' and by virtue of this placement have the same length.

In addition, in the second embodiment, idler pulley 78' is located below the lower run of drive belt 70' rather than being located above the lower run of drive belt 70 as in the first embodiment. Thus, in the second embodiment, to increase tension in drive belt 70', plate 90' is pivoted upwardly rather than downwardly. Despite these differences between the two embodiments, however, the basic concept of a manually adjustable pivotal plate 90' to adjust the tension in drive belt 70' without affecting the position of brush 32' relative to roller 18 is the same.

The Cap Screw Drive

One difference between the two embodiments is how brush 32' is driven from reel 12. Referring now to FIGS. 7 and 8, one end of reel shaft 88 has a bore 110 with a threaded interior diameter into which a hardened cap screw 112 can be threaded. Cap screw 112 has a non-circular head 114, such as the hex head shown in FIG. 8.

Drive shaft 74' for brush 32' will be provided with a similarly shaped socket 116, i.e. a hex head socket as shown in FIG. 8, for receiving head 114 of cap screw 112. Thus, when reel 12 rotates, drive is transmitted to drive shaft 74' of the belt drive system through the hardened cap screw 112 and its non-circular mating configuration with socket 116 in one end of drive shaft 74'. Cap screw 112 has to be sufficiently hardened in order to be durable under normal usage.

The use of a cap screw 112 whose head 114 is non-rotatably received in a socket 116 in drive shaft 74' is a very cost effective way of driving brush 32' from reel 12. It is less expensive than the splined connection described with respect to the first embodiment of roller cleaning brush assembly 30. Moreover, since many reel cutting units 4 already in the field have a threaded bore 110 on one end of reel shaft 88 to attach a backlapping tool to reel 12, using a cap screw 112 threaded into this same bore to drive roller cleaning brush assembly 30' allows the second embodiment of roller cleaning brush assembly 30' to be more easily retrofit to existing cutting units.

DESCRIPTION OF PREFERRED EMBODIMENTS

This Detailed Description sets forth various preferred embodiments for various aspects of a roller cleaning brush assembly of the type shown herein. For example, while brush 32 has been shown as having one helical flight 48 of brush bristles secured to brush shaft 32, multiple flights 48 could be applied as long as J-hook fasteners 54 for the multiple flights are offset or staggered so as not to interfere with one another. In addition, bearing housings 40 could be keyed or splined relative to brackets 38 to prevent bearing housings 40 from rotating relative to brackets 38 as they are slid up and down on brackets 38. Accordingly, embodiments other than those illustrated herein fall within this invention.

Various other modifications of this invention will be apparent to those skilled in the art. Thus, the invention is to be limited only by the appended claims.

We claim:

1. A roller cleaning brush assembly for cleaning a ground engaging roller of a grass cutting unit of a mower, which comprises:
   (a) a brush comprising:
      (i) a brush shaft;
      (ii) at least one flight of brush bristles located around the brush shaft; and
      (iii) a pair of fasteners for releasably fixing opposite ends of the flight of brush bristles to the brush shaft to allow a worn flight of brush bristles to be removed from the brush shaft and to be replaced with a new flight of brush bristles; and
   (b) a pair of bearings for rotatably supporting opposite ends of the brush shaft on the cutting unit on a position in which the flight of brush bristles contacts an outer diameter of the ground engaging roller.

2. The roller cleaning brush assembly of claim 1, wherein the fasteners are shaped to clamp the opposite ends of the flight of brush bristles to the brush shaft.

3. The roller cleaning brush assembly of claim 1, wherein each fastener is a J-hook fastener having a short leg and a long leg joined by a U-shaped end, wherein the short and long legs of the fastener are received in spaced holes in one end of the brush shaft with the U-shaped end of the fastener facing towards the brush shaft and engaging against the flight of brush bristles to clamp the flight of brush bristles to the roller shaft.

4. The roller cleaning brush assembly of claim 3, wherein the long leg passes completely through one of the holes in the brush shaft to have a free end thereof exposed on an opposite side of the roller shaft, and wherein the free end of the long leg is threaded to receive a threaded nut which can be tightened against the opposite side of the roller shaft such that the nut holds the fastener in place when the short and long legs are received in the spaced holes in one end of the brush shaft.

5. The roller cleaning brush assembly of claim 1, wherein the cutting unit is a reel cutting unit.

6. The roller cleaning brush assembly of claim 1, wherein the flight of brush bristles is helically wound around the brush shaft.

7. The roller cleaning brush assembly of claim 1, wherein only a single flight of brush bristles is attached to the brush shaft.

8. A roller cleaning brush assembly for cleaning a ground engaging roller of a grass cutting unit of a mower, which comprises:
   (a) a brush shaft rotatably journalled to the cutting unit with the brush shaft having at least one flight of brush bristles in contact with the roller to clean the roller; and
   (b) wherein the flight of brush bristles is releasably attached to the brush shaft by at least one fastener such that the flight of brush bristles can be removed and replaced on the brush shaft.

9. A roller cleaning brush assembly for cleaning a ground engaging roller of a grass cutting unit of a mower, which comprises:
   (a) a rotatable brush attached to the cutting unit and having at least one flight of brush bristles in contact with the roller to clean the roller; and
   (b) a belt drive system for rotating the brush, wherein the belt drive system comprises:
      (i) an endless drive belt entrained around a drive pulley and a driven pulley;
      (ii) an idler member in contact with the drive belt and movable relative to the drive belt for adjusting tension in the drive belt; and
      (iii) wherein the idler member is selectively adjustable on the cutting unit by a manual adjustment made by a user to adjust the drive belt tension without changing the position of the brush relative to the roller.

10. The roller cleaning brush assembly of claim 9, further including a tensioning plate pivotally carried on the cutting unit, wherein the tensioning plate carries the idler member.

11. The roller cleaning brush assembly of claim 10, wherein the tensioning plate is pivotally adjustable on the cutting unit about a pivot axis, and wherein the tensioning plate includes an elongated slot spaced from the pivot axis through which slot a brush shaft of the brush passes such that the tensioning plate can be pivoted about the pivot axis without moving the brush shaft either horizontally or vertically.

12. The roller cleaning brush assembly of claim 11, further including at least one fastener for locking the tensioning plate in a pivotally adjusted position.

13. The roller cleaning brush assembly of claim 12, wherein the at least one fastener comprises a bolt passing through an elongated slot in the tensioning plate.

14. The roller cleaning brush assembly of claim 9, wherein the brush comprises a brush shaft having at least one flight of brush bristles, and wherein each end of the brush shaft is rotatably journalled in bearings carried in bearing housings, the bearing housings being attached to the cutting unit.

15. The roller cleaning brush assembly of claim 14, wherein the ground engaging roller is rotatably journalled on roller supports whose height can be adjusted relative to the cutting unit to change the cutting unit's height of cut, and wherein the bearing housings are attached to the roller supports so that the brush moves up and down in concert with the ground engaging roller as the cutting unit's height of cut is adjusted.

16. The roller cleaning brush assembly of claim 15, wherein the bearing housings are attached to the roller supports by brackets with the bearing housings being adjustable in elongated slots on the brackets to be able to adjust the position of the brush towards or away from the roller.

17. A roller cleaning brush assembly for cleaning a ground engaging roller of a grass cutting unit of a mower, wherein the roller is rotatably journalled in spaced roller supports that are vertically adjustable to change the cutting unit's height of cut, which comprises:
(a) a brush comprising a brush shaft which carries at least one flight of brush bristles;
(b) a pair of bearings for rotatably journalling opposite ends of the brush shaft, the bearings being carried in a pair of bearing housings;
(c) a pair of brackets for supporting the bearing housings on the roller supports such that the brush moves up and down with the roller as the height of cut is adjusted;
(d) wherein the bearing housings are vertically adjustable on the brackets to allow each end of the brush shaft to be adjusted towards and away from the roller to compensate for wear in the brush bristles.

18. The roller cleaning brush assembly of claim 17, further including a belt drive system for rotating one end of the brush shaft to rotate the brush relative to the roller, the belt drive system comprising:
(a) a drive pulley located on a drive shaft;
(b) a driven pulley located on the one end of the brush shaft;
(c) a drive belt entrained around the drive and driven pulleys to transfer drive from the drive shaft to the brush shaft;
(d) a pivotal tensioning plate that carries a tensioning member for adjusting tension in the drive belt, the tensioning plate being pivotally connected at one end to the cutting unit and having an elongated slot at the other end through which the one end of the brush shaft passes; and
(e) wherein the slot in the other end of the pivotal tensioning plate is sufficiently long so that the tension of the drive belt can be adjusted by moving the tensioning member into more or less contact with the drive belt without having the tensioning plate move the brush shaft such that the position of the brush relative to the roller remains unchanged during a drive belt tensioning adjustment operation.

19. The roller cleaning brush assembly of claim 18, wherein the cutting unit is a reel cutting unit having a rotatable reel that sweeps uncut grass against a bedknife, and wherein the drive shaft is rotatably driven from the reel.

20. A roller cleaning brush assembly for cleaning a ground engaging roller of a reel cutting unit of a mower, the reel cutting unit having a rotatable reel that sweeps uncut grass against a bedknife, one end of a shaft of the reel being having an interiorly threaded bore, which comprises:
(a) a rotatable brush attached to the cutting unit and having at least one flight of brush bristles in contact with the roller to clean the roller; and
(b) a belt drive system for rotating the brush, wherein the belt drive system is powered by:
(i) a drive shaft having a non-circular socket at one end;
(ii) a cap screw having a threaded shank and a non-circular head, the shank of the cap screw being screwed into the interiorly threaded bore on the one end of the cutting reel shaft and the non-circular head of the cap screw having a shape which matches that of the non-circular socket on the drive shaft to allow the head of the cap screw to be inserted into the socket on the drive shaft to rotatably power the drive shaft from rotation of the cutting reel shaft.

* * * * *

UNITED STATES PATENT AND TRADEMARK OFFICE
CERTIFICATE OF CORRECTION

PATENT NO.    : 6,688,094 B2
DATED         : February 10, 2004
INVENTOR(S)   : Dennis J. Berndt et al.

It is certified that error appears in the above-identified patent and that said Letters Patent is hereby corrected as shown below:

<u>Column 8,</u>
Line 7, change "on a position" to -- in a position --.

<u>Column 10,</u>
Line 32, delete "being".

Signed and Sealed this

Thirteenth Day of April, 2004

JON W. DUDAS
*Acting Director of the United States Patent and Trademark Office*